(12) United States Patent
Roo et al.

(10) Patent No.: US 10,618,496 B2
(45) Date of Patent: Apr. 14, 2020

(54) SAFETY BELT BUCKLE

(71) Applicants: Young Goun Roo, Gwangju (KR); Min Park, Gyeongsangnam-do (KR)

(72) Inventors: Young Goun Roo, Gwangju (KR); Min Park, Gyeongsangnam-do (KR)

(73) Assignee: YOUFRIEND CO., LTD., Gwangju (KR)

( * ) Notice: Subject to any disclaimer, the term of this patent is extended or adjusted under 35 U.S.C. 154(b) by 0 days.

(21) Appl. No.: 16/419,024

(22) Filed: May 22, 2019

(65) Prior Publication Data

US 2019/0359168 A1   Nov. 28, 2019

(51) Int. Cl.
*B60R 22/18* (2006.01)
*H01H 13/18* (2006.01)
*B60R 22/48* (2006.01)

(52) U.S. Cl.
CPC .......... B60R 22/18 (2013.01); H01H 13/186 (2013.01); *B60R 2022/1806* (2013.01); *B60R 2022/1812* (2013.01); *B60R 2022/4816* (2013.01)

(58) Field of Classification Search
CPC .... B60R 2022/1806; B60R 2022/1812; B60R 2022/4816; B60R 22/18; H01H 13/186
See application file for complete search history.

(56) References Cited

U.S. PATENT DOCUMENTS

| | | | |
|---|---|---|---|
| 5,749,130 A * | 5/1998 | Bilyeu | A44B 11/2565 24/602 |
| 5,839,174 A * | 11/1998 | Chamings | B60R 22/48 24/633 |
| 6,907,646 B2 * | 6/2005 | Lee | B60R 22/48 180/268 |
| 7,538,283 B2 * | 5/2009 | Muromachi | A44B 11/2515 200/61.58 B |
| 2007/0271746 A1 | 11/2007 | Midorikawa et al. | |
| 2011/0232051 A1 * | 9/2011 | Carlton | B60R 22/48 24/593.1 |
| 2012/0137478 A1 * | 6/2012 | Nimura | B60R 22/48 24/593.1 |
| 2013/0174390 A1 * | 7/2013 | Muromachi | A44B 11/2523 24/633 |

FOREIGN PATENT DOCUMENTS

KR    10-0661693    12/2006

* cited by examiner

*Primary Examiner* — Robert Sandy
*Assistant Examiner* — David M Upchurch
(74) *Attorney, Agent, or Firm* — Eric L. Lane; Green Patent Law

(57) ABSTRACT

The present invention relates to a safety belt buckle, and more specifically, to a safety belt buckle which can stably detect whether a driver's safety belt is fastened even when foreign materials or water is introduced into the buckle in the case of being fastened with a tongue of a safety belt.

In the safety belt buckle according to the present invention, a switch that detects whether a tongue of a safety belt is fastened is blocked from coming into direct contact with water or foreign materials, which are introduced from the outside, so as to stably detect fastening or unfastening of the tongue of the safety belt, and thus the safety belt buckle can be stably operated even when mounted in a seat exposed to the outside such as a seat of a forklift or a tractor.

5 Claims, 6 Drawing Sheets

SAFETY BELT BUCKLE

CROSS-REFERENCE TO RELATED APPLICATION

This application claims priority to and the benefit of Korean Patent Application No. 10-2018-0058582, filed on May 23, 2018, the disclosure of which is incorporated herein by reference in its entirety.

BACKGROUND

1. Field of the Invention

The present invention relates to a safety belt buckle, and more specifically, to a safety belt buckle which stably detects whether a driver's safety belt is fastened even when foreign materials or water is introduced into the safety belt buckle in the case of being fastened with a tongue of the safety belt.

2. Discussion of Related Art

Generally, a vehicle is equipped with an air bag and a safety belt as a safety device for promoting the safety of a driver who drives the vehicle and passengers. The air bag and the safety belt block bodies of a driver and passengers from a structure of a vehicle to prevent a part of the bodies of the driver and the passengers, who sit on a seat, from coming into contact with or colliding against an internal structure of the vehicle in the case of accident and also prevent the bodies from being separated from the seat. Particularly, in the case of a collision in traffic while driving, the safety belts (seat belts) fix upper bodies of a driver and passengers to safely protect the driver and passengers to prevent the bodies of the driver and passengers from colliding against an instrument panel and the like so as to minimize casualties.

In a schematic configuration view of such a safety belt, the safety belt includes a buckle fixed to one portion of a floor panel by a cable, a retractor around which webbing fixed to a lower portion of a center pillar is wound, a tongue provided to be coupled with the buckle on the webbing, which is extracted from the retractor by a predetermined length, a guider that prevents the webbing from being tangled when the webbing is extracted or wound up, and an anchor that adjusts the height of the belt.

Thus, both ends of webbing with a predetermined width are fixed to a floor panel and a center pillar, and a user is positioned between the floor panel and the center pillar, and thus the safety belt prevents a user's body from being thrown out of a seat in a forward or accidental direction in the case of an accident.

Further, the seat belt includes a retractor and a buckle, wherein the retractor generally fastens or unfastens webbing, is fixed to the center pillar to extract the webbing, and has an emergency fixing unit, and the buckle is installed on a floor panel and selectively fixes a tongue provided on an end of the webbing.

The safety belt configured as above has used a non-contact detection method using a hall sensor, a detection method using a micro-switch or a reed switch as an alarm switch, or both the method using the hall sensor and the method using the alarm switch, wherein the hall sensor is operated according to a magnetic field formed by changing a position of a magnet to detect fastening of a safety belt.

However, when the unit for detecting fastening of a safety belt is applied to a vehicle such as a forklift or a tractor which has a driver's seat exposed to the outside, foreign materials or rainwater is introduced into a buckle, and thus the unit does not properly detect whether the safety belt is fastened.

Meanwhile, a foreign material prevention device of a safety belt buckle for a vehicle disclosed in Korean Utility Model Registration No. 20-0156303 includes an electromagnet mounted on a lower surface of an inner space of a safety belt buckle, an attachment piece that is supported on a return spring to move toward the electromagnet when the electromagnet is activated and to move away from the electromagnet when the electromagnet is inactivated, a cover that covers an open side of the inner space of the buckle, and a rod that connects the attachment piece and the cover, and thus the foreign material prevention device prevents foreign materials from being introduced into the inner space of the buckle.

However, in the foreign material prevention device of a safety belt buckle for a vehicle, when a rotation detection unit, which detects that a safety belt is extracted from a retractor, or an electromagnet malfunctions, the cover is not moved smoothly, and thus an accident may occur in which the cover moves downward toward the electromagnet so that a tongue of the safety belt enters the buckle.

(Patent Document)
Korean Registered Patent No. 10-1148166: Hall Switch of Safety Belt Buckle for Vehicle
Korean Utility Model Registration No. 20-0156303: Foreign Material Prevention Device of Safety Belt Buckle for Vehicle

SUMMARY OF THE INVENTION

The present invention is directed to providing a safety belt buckle provided with a switch capable of detecting fastening or unfastening of a tongue without malfunctions even when foreign materials or water is introduced into the buckle.

According to an aspect of the present invention, there is provided a safety belt buckle which includes: a lower frame and an upper frame which are coupled to form a tongue accommodation part, which has one open side, to accommodate a tongue of a safety belt; an ejector which is pressed by the tongue, which enters the tongue accommodation part, to be moved from a first position to a second position in the tongue accommodation part in a first direction, which is a direction in which the tongue enters, and is supported on a first flexible member in the tongue accommodation part to return to the first position when the tongue is detached from the ejector; a latch member which, when the ejector is positioned at a first position, passes through the upper frame from an upper side of the upper frame and comes into contact with the ejector to be blocked from entering the tongue accommodation part and, when the ejector is moved to a second position, enters the tongue accommodation part to pass through an inside of the tongue so as to restrain the tongue; a switch housing which is mounted on an upper surface of the upper frame to be spaced apart from the latch member in the first direction and has one side on which a leaf spring is mounted, wherein the leaf spring extends in a direction of the latch member to press the latch member in a direction of the tongue accommodation part; an unfastening button which has both sides mounted in the lower frame or the upper frame to be slidable in the first direction, separates the latch member, which passes through the tongue, in a direction away from the upper frame so that the ejector returns to the first position when the unfastening button is moved in the first direction; and a switch which is inserted into the switch housing and pressed or released by the ejector, which moves in the tongue accommodation part, to generate an electric signal so as to detect whether the tongue is restrained in the tongue accommodation part or released therefrom, and which blocks water or foreign materials, which is to be introduced into the tongue accommodation part, from coming into contact therewith using a waterproof unit.

The switch may include a case fixed to the switch housing, a pressing member, and a button member, wherein the pressing member has one end fixed to one side of the case that faces the tongue, which is inserted into the tongue accommodation part, protrudes in a direction of the tongue, extends in a direction diagonal to the first direction, and is rotated or bent by being pressed by the ejector which is moved to the second position, and the button member which is moved to an inside of the case to come into electric contact with terminals in the case when the pressing member is pressed by the ejector, and protrudes from the case to be released from being in electric contact with the terminals when pressing of the pressing member is released, wherein the waterproof unit includes a flexible member which is formed to cover the case and the pressing member and is made of a flexible material to prevent the pressing member, which is rotated or bent by being pressed by the ejector, from interfering therewith.

The flexible member may include a first flexible tube formed to extend in the first direction so that an inside thereof covers a lower portion of the case with which a cable is connected and the terminals which protrude from the case, and a second flexible tube which has an inner space, which has an opening formed on one side thereof, to accommodate an upper portion of the case on which the pressing member is mounted, and surrounds the upper portion of the case with the pressing member to overlap or be in contact with the first flexible tube which covers the lower portion of the case, wherein the second flexible tube extends in the direction of the tongue to be long in a direction from one edge of the case, to which the pressing member is fixed, toward the other edge, which is a width direction of the case, to correspond to the pressing member, which extends in a direction diagonal to the first direction, and includes a wrinkled part formed to be easily flexible with the pressing member when the pressing member is bent or rotated.

The second flexible tube may further include an auxiliary pressing protrusion that induces a degree of bending or rotation of the pressing member to increase, wherein the auxiliary pressing protrusion protrudes from a side that surrounds one end of the pressing member in a direction in which the tongue enters the tongue accommodation part.

The flexible member may include a first flexible tube which is formed to extend in the first direction so that an inside thereof covers a lower portion of the case with which a cable is connected and the terminals which protrude from the case, and a second flexible tube which has an inner space, which has an opening formed on one side thereof, to accommodate an upper portion of the case on which the pressing member is mounted, includes a pressing member through part which is formed on a side corresponding to one end of the pressing member so that the pressing member passes therethrough and extends, and surrounds an upper portion of the case to overlap or to be in contact with the first flexible tube that covers a lower portion of the case.

The case may be formed in a rectangular shape, and the flexible member may include a first flexible tube and a flexible cover, wherein the first flexible tube is formed to extend in the first direction so that an inside thereof covers a lower portion of the case with which a cable is connected and the terminals which protrude from the case, and the flexible cover includes an upper cover part, first and second side cover parts, a first restraining part, and a second restraining part, wherein the upper cover part is formed to have a length smaller than a width of the case in a longitudinal direction of the pressing member and is positioned on an inner side of an upper surface of the case to cover a button member that protrudes from the case, the first and second side cover parts extend from both sides of the upper cover part in a direction of the cable to cover both sides of the case and extend to be branched in directions of lower corners of the case, wherein the upper cover part intersects a longitudinal direction of the pressing member, a first restraining part connects one sides of the first and second side cover parts that correspond to each other, covers a lower corner of one side of the case, and restrains one side of the first flexible tube, and a second restraining part connects the other sides of the first and second side cover parts that correspond to each other, covers a lower corner of the other side of the case, and restrains the other side of the first flexible tube.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
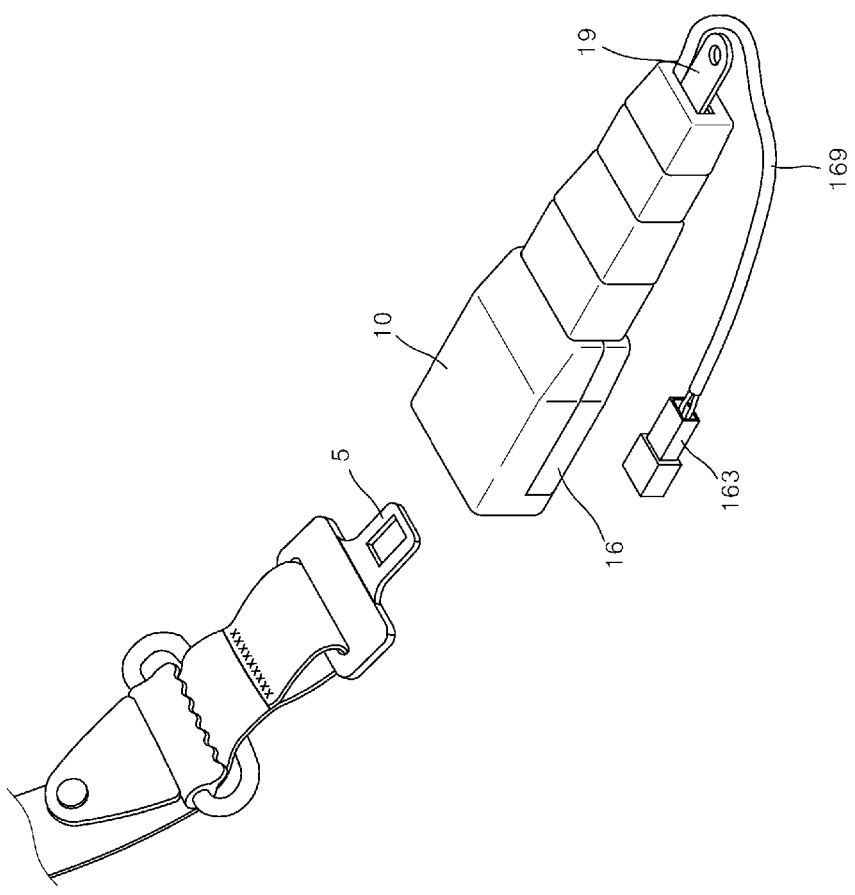
FIG. 1 is a perspective view showing a state in which a safety belt is fastened with a safety belt buckle according to a first embodiment of the present invention.

Hereinafter, a safety belt buckle according to the present invention will be described with reference to the accompanying drawings.

A safety belt buckle according to a first embodiment of the present invention is shown in FIGS. 1 to 4.

The safety belt buckle according to the first embodiment of the present invention, which allows a tongue 5 of a safety belt to be inserted inward thereof and fastened thereto to fix the safety belt, includes an upper cover 10, a lower cover 16, an upper frame 30, a lower frame 50, an ejector 70, a first flexible member 80, a latch member 90, a switch housing 110, a leaf spring 130, an unfastening button 140, a second flexible member 150, and a switch 160.

The upper frame 30 and the lower frame 50 are coupled to form a tongue accommodation part 26, which has one open side, to accommodate the tongue 5 of the safety belt therein.

First, the upper frame 30 is formed in a planar shape and includes a first slot 31 that is formed in the center of the front portion thereof and extends in a longitudinal direction thereof, first and second through parts 36 and 41 that are formed on both sides of the first slot 31 so that first and second vertical extension parts 56 and 61 of the lower frame 50, which is described below, pass therethrough, and a first mount hole 39 that is formed in the center of the rear portion thereof to pass therethrough so as to be bolt-coupled to a bracket 19 fixed to a lateral portion of a seat (not shown), wherein the front portion refers to a direction in which the tongue 5 enters the tongue accommodation part 26.

Figure 2:
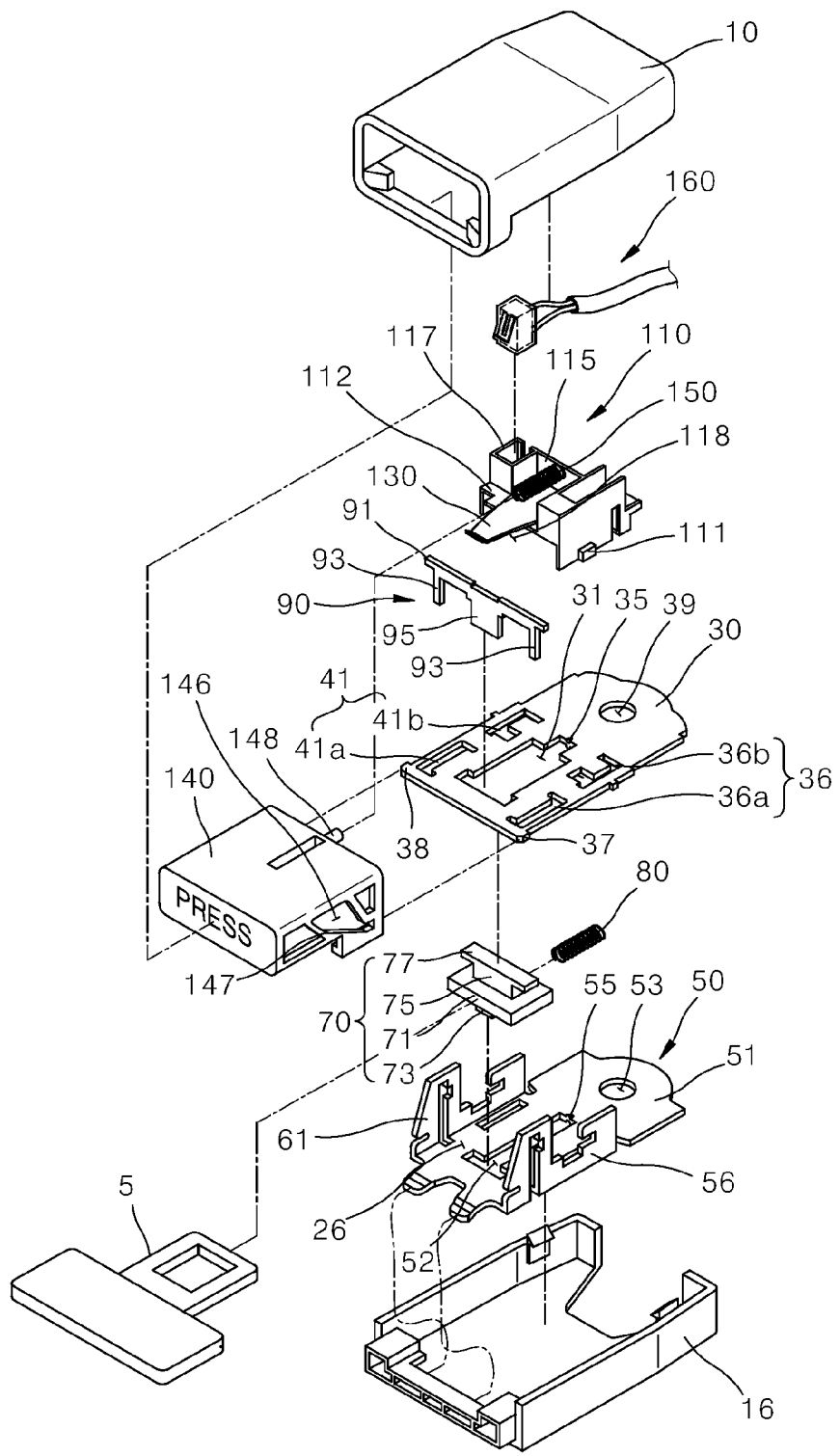
FIG. 2 is an exploded perspective view of the safety belt buckle in FIG. 1.
Figure 3:
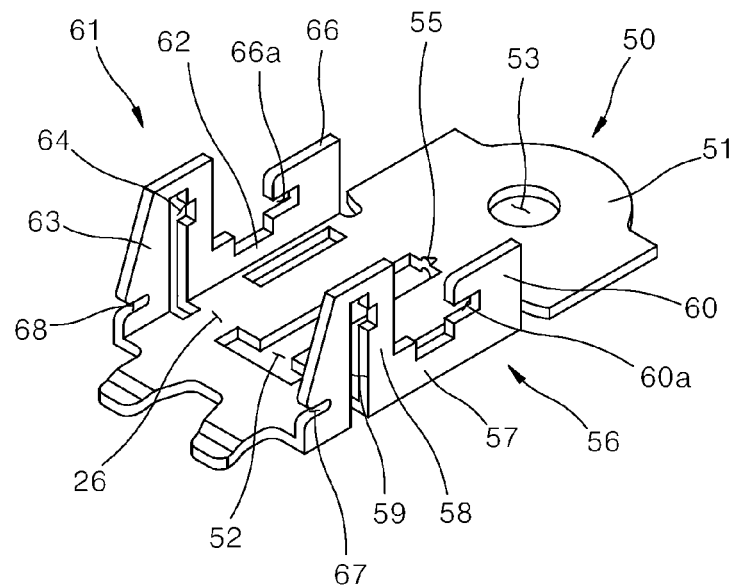
FIG. 3 is a perspective view of a lower frame of the safety belt in FIG. 1.

The first slot 31 is a portion through which an upper portion of the ejector 70 described below passes and along which the upper portion of the ejector 70 moves in an extension direction. Referring to FIG. 2, the first slot 31 is formed to pass through the upper frame 30, and one end of the front portion of the first slot 31 is longer than the other end thereof in a width direction of the upper frame 30.

The first and second through parts 36 and 41 will be described below with the first and second vertical extension parts 56 and 61 of the lower frame 50.

The lower frame 50 includes a horizontal extension part 51 and the first and second vertical extension parts 56 and 61, wherein the horizontal extension part 51 includes a second slot 52 that is formed in the center of the horizontal extension part 51 and extends in a longitudinal direction, and the first and second vertical extension parts 56 and 61 extend from both sides of the horizontal extension part 51 in a direction that is perpendicular to the horizontal extension part 51 and pass through the first and second through parts 36 and 41.

Meanwhile, the upper frame 30 is supported on the first and second vertical extension parts 56 and 61 of the lower frame 50, which pass through the first and second through parts 36 and 41, and is spaced apart from the horizontal extension part 51 to form the tongue accommodation part 26 with the lower frame 50. The first and second through parts 36 and 41 of the upper frame 30 include first through holes 36a and 41a and second through holes 36b and 41b, wherein the first through holes 36a and 41a are formed on the front portion of the upper frame 30 to pass therethrough and extend in a longitudinal direction of the upper frame, and the second through holes 36b and 41b are formed on a rear portion of the upper frame 30 and extend in a longitudinal direction of the upper frame.

The second slot 52 of the lower frame 50 is formed to pass through the lower frame 50, has a width smaller than that of the first slot 31, is formed at a position that overlaps the first slot 31 when the first and second vertical extension parts 56 and 61 are mounted to pass through the first and second through parts 36 and 41, and extends to a position corresponding to an end of the first slot 31.

Further, the horizontal extension part 51 includes a second mount hole 53 that passes through the center of the rear portion of the lower frame, corresponds with the first mount hole 39 of the upper frame when the first and second vertical extension parts 56 and 61 are mounted to pass through the first and second through parts 36 and 41, and is bolt-coupled to the bracket 19 mounted on a lateral portion of the seat (not shown).

The first and second vertical extension parts 56 and 61 include frame support parts 57 and 62, latch member restraining parts 58 and 63, and switch housing restraining parts 60 and 66, wherein the frame support parts 57 and 62 are formed to be bent upward from both sides of the horizontal extension part 51 and support the upper frame 30, the latch member restraining parts 58 and 63 are formed to pass through front portions of the frame support parts 57 and 62, extend upward from the horizontal extension part 51, and have incised holes 59 and 64 that are formed to extend to an edge of the horizontal extension part 51 in a vertical direction and to pass therethrough in a curved manner, restrain ends of the latch member 90, which is described below, and guide a movement direction of the latch member 90 so that the latch member 90 moves closer to or away from the tongue accommodation part 26, and the switch housing restraining parts 60 and 66 are formed on rear portions of the frame support parts 57 and 62, extend upward from the horizontal extension part 51, and have fastening grooves 60a and 66a which are formed in sides that face the latch member restraining parts 58 and 63 to extend in a rear direction and fastened with both sides of the switch housing 110 described below.

Further, the latch member restraining parts 58 and 63 of the first and second vertical extension parts 56 and 61 include escape preventing grooves 67 and 68 which extend in a rear direction from a side portion and into which escape preventing protrusions 37 and 38, which protrude from both sides of front ends of the upper frame in the opposite direction, are inserted so as to prevent the upper frame 30 from coming out, wherein the side portion is adjacent to an inlet of the tongue accommodation part 26 through which the tongue 5 of the safety belt enters.

Further, the upper frame 30 includes a first support protrusion 35 that protrudes from a rear end of the first slot 31 in a direction of the tongue accommodation part 26 and supports one portion of an end of the first flexible member 80, and the lower frame 50 includes a second support protrusion 55 that protrudes from a rear end of the second slot 52 in the direction of the tongue accommodation part and supports the other end portion of the first flexible member.

The ejector 70 is pressed by the tongue 5 that enters the tongue accommodation part 26 to move from a first position 26a toward a second position 26b in a first direction and is supported on the first flexible member 80 in the tongue accommodation part 26 to return to the first position 26a when the tongue 5 is detached from the ejector 70, wherein the first position 26a is a front side of the tongue accommodation part 26, the second position 26b is a rear side of the tongue accommodation part 26, and the first direction is a direction in which the tongue 5 enters.

The ejector 70 includes a tongue contact part 71 formed to have a width greater than those of the first and second slots 31 and 52 and is positioned in the tongue accommodation part 26 to be in direct contact with the tongue 5 accommodated in the tongue accommodation part 26, a second slot guide part 73 that protrudes downward from the center of a lower surface of the tongue contact part, extends in the first direction, and is guided along the second slot 52, wherein the first direction is a direction in which the tongue 5 enters the tongue accommodation part 26, a first slot guide part 75, which protrudes upward from the center of an upper surface of the tongue contact part 71, uniformly extends in the first direction to have a width greater than or equal to that of the first slot and is guided along the first slot 31, and a switch pressing part 77 that protrudes from an end of the front portion of the first slot guide part 75 in a direction away from the tongue accommodation part 26 and extends by a width greater than that of the first slot 31 to press the switch 160 described below.

When the ejector 70 is positioned at a first position 26a, the latch member 90 passes through the first slot 31 from an upper side of the upper frame 30 and comes into contact with an upper surface of the tongue contact part 71 of the ejector 70 to be blocked from entering the tongue accommodation part 26, and when the ejector 70 is moved to the second position 26b, the latch member 90 enters the tongue accommodation part 26 and passes through the tongue 5 so as to restrain the tongue 5.

The latch member 90 includes a restraint support part 91, a plurality of movement guide bars 93, and a tongue fastening part 95, wherein the restraint support part 91 that extends in a width direction of the lower frame 50 has both ends that protrude in lateral directions of the incised holes 59 and 64 of the latch member restraining parts 58 and 63 formed on both sides of the lower frame 50, the plurality of movement guide bars 93 extend at positions, which are spaced apart from both ends of the restraint support part 91 inward by a predetermined distance, in a direction of the tongue accommodation part 26 that is toward lower portions of the incised holes 59 and 64 that extend to an edge of the horizontal extension part 51, and the tongue fastening part 95 extends between the plurality of movement guide bars 93 in the direction of the tongue accommodation part 26 through the first slot 31 to come into contact with the ejector 70 positioned at the first position 26a or enters the tongue 5 to restrain the tongue 5 when the ejector 70 is moved to the second position 26b.

The latch member 90 is pressed by the leaf spring 130, wherein the leaf spring 130 has one portion fixedly mounted on the switch housing 110, which is described below and positioned in a rear direction, and the other portion extends in the direction of the latch member 90 and presses an upper end of the restraint support part 91 in the direction of the tongue accommodation part 26.

The switch housing 110 is mounted on an upper surface of the upper frame 30 to be spaced apart from the latch member 90 in a first direction and has the leaf spring 130 mounted in the center thereof.

The switch housing 110 includes fastening protrusions 111 that protrude from both sides thereof and are inserted into the fastening grooves 60a and 66a and prevents the fastening protrusions 111 from coming out in a perpendicular direction that intersects the first direction.

Referring to FIG. 2, the switch housing 110 includes an ejector accommodation part 112, a second flexible member support part 115, and a switch mount part 117, wherein the ejector accommodation part 112 has a front portion, which is open in a direction facing the upper frame 30 and a direction facing the switch pressing part 77 of the ejector 70, and accommodates the switch pressing part 77 when the ejector 70 moves toward the second position 26b, the second flexible member support part 115 extends in the center of a rear portion of the switch housing 110 in a direction in which the upper frame 30 is coupled with the lower frame 50 and includes a first fixing protrusion 116 which protrudes from one portion that faces the latch member 90 and to which an end of the second flexible member 150 is fixed so that the second flexible member 150 extends in the first direction, and the switch mount part 117 includes the switch 160 mounted on the left or right of the second flexible member support part 115.

The switch mount part 117 includes an inner space 118 formed so that the switch 160 is accommodated therein, wherein the inner space 118 has a closed front side, in which a lower portion of the closed front side is incised to communicate with the switch pressing part 77, and open upper and lower sides.

Further, the switch mount part 117 includes a slit 118 which is formed in a lower portion of the second flexible member support part 115 and into which an end of the leaf spring 130 is inserted and mounted.

The unfastening button 140 has an inner space and open lower and rear sides, and both edges of the upper frame 30 are inserted into both sides of the inner surface of the unfastening button 140 and mounted so that the upper frame 30 slidably moves in the first direction, and thus one portions of the latch member 90 and the leaf spring 130 are accommodated in the unfastening button 140.

The unfastening button 140 includes restraint support part through holes 146 formed in both sides thereof to pass therethrough to accommodate both ends of the restraint support part 91 of the latch member 90. When the unfastening button 140 is moved to the first direction by an external force, the unfastening button 140 separates the latch member 90, which passes through the tongue 5, in a direction away from the upper frame 30 so that the ejector 70, which is moved to the second position 26b, returns to the first position 26a.

The unfastening button 140 includes an inclined part 147. Since the restraint support part through holes 146 are formed to be tapered downward, when the unfastening button 140 is moved to the second position 26b, the inclined part 147 allows the restraint support part 91, which is on the front side of the restraint support part through hole 146, to be pulled in an upward direction.

The unfastening button 140 includes a second fixing protrusion 148 that is formed in the center of a rear portion thereof to fix an end of the second flexible member 150 so that the unfastening button 140 is supported on the second flexible member 150, which is fixed to the switch housing 110, to return to the original position when the external force is released.

The switch 160 is inserted into the switch mount part 117 of the switch housing 110 and is pressed by the ejector 70, which moves in the tongue accommodation part 26, or released to generate an electric signal to detect whether the tongue 5 is accommodated in the tongue accommodation part 26 or is released therefrom.

The switch 160 blocks foreign materials or water that may be introduced into the tongue accommodation part 26 from coming into contact therewith using a waterproof unit.

The switch 160 includes a case 161, a pressing member 165, a button member 168, and a cable 169.

The case 161, which is a portion that is inserted into the switch mount part 117 of the switch housing 110 and fixed thereto, is formed in a rectangular shape but a shape thereof is not limited as long as the case 161 may be inserted into and fixed to the switch mount part 117.

The pressing member 165 has one end fixed to one portion of the case 161 that faces the tongue 5 inserted into the tongue accommodation part 26, protrudes in a direction of the tongue, extends in a direction diagonal to the first direction, and extends to the ejector accommodation part 112 of the switch housing 110.

The pressing member 165 is pressed by the ejector 70 that is moved to the second position 26b in the ejector accommodation part 112 so that an end of the pressing member 165 is rotated or bent to be adjacent to the case 161.

When the pressing member 165 is pressed by the ejector 70, the button member 168 is moved to the inside of the case 161 to come into electric contact with terminals 166 and 167 in the case 161, and when pressing of the pressing member 165 is released, the button member 168 protrudes from the case 161 to be released from being in electric contact with the terminals.

The waterproof unit is formed to cover the case 161 and the pressing member 165 and includes a flexible member 170 that is formed of a flexible material so as to not interfere with the pressing member 165 which is rotated or bent when being pressed by the ejector 70.

Figure 4:
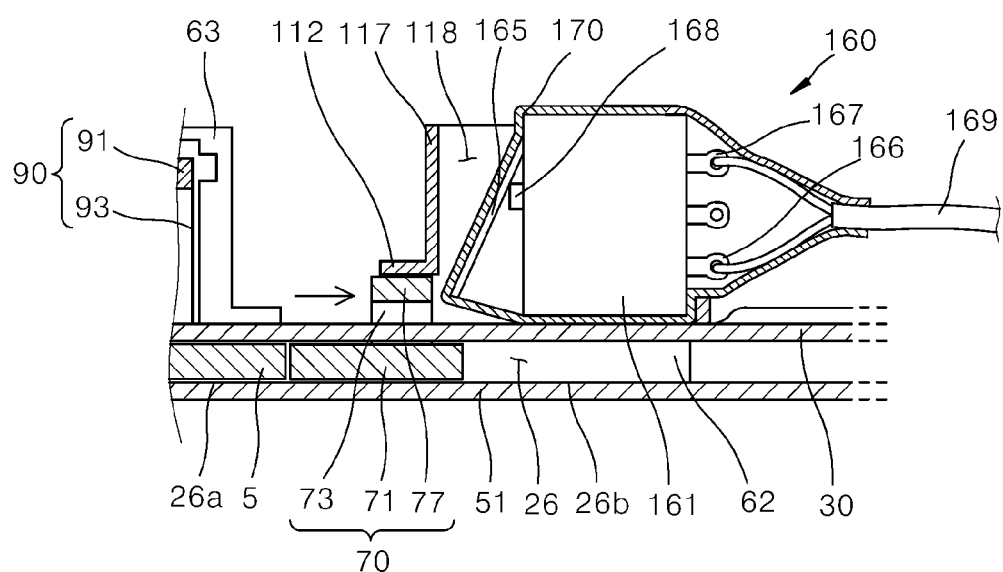
FIG. 4 is a side cross-sectional view of a part of the safety belt buckle showing a state in which a switch of the safety belt in FIG. 1 is pressed.

As shown in FIG. 4, the flexible member 170 has an inner space having one open side to accommodate the pressing member, the case, and the terminals in the inner space, and the open side may be formed of a rubber material to cover an outer surface of the cable 169.

The cable 169 has one side connected with the terminals and the other side on which a connector 163 for connection with a control unit of the vehicle is mounted.

The safety belt buckle according to the first embodiment of the present invention blocks a switch, which detects whether a tongue of a safety belt is fastened, from coming into direct contact with water or foreign materials introduced from the outside so as to stably detect whether the tongue of the safety belt is fastened or unfastened, thereby having an advantage of being stably operated even when mounted on a seat exposed to the outside such as a seat of a forklift, a tractor, or the like.

Meanwhile, the flexible member may be applied with various embodiments as shown in FIGS. 5 to 9.

Figure 5:
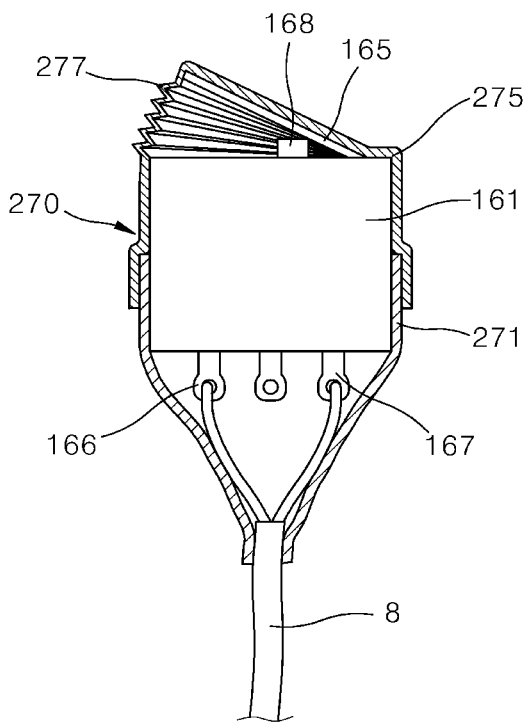
FIG. 5 is a side cross-sectional view of a part of a switch according to a second embodiment of the present invention.

A switch of a safety belt buckle according to a second embodiment of the present invention is shown in FIG. 5. Components having the same functions as those in the drawings shown above are denoted by the same reference numerals.

The safety belt buckle according to the second embodiment of the present invention shown in FIG. 5 has the same structure as the safety belt buckle according to the first embodiment of the present invention except for a flexible member 270.

As shown in FIG. 5, the flexible member 270 includes a first flexible tube 271 and a second flexible tube 275, wherein the first flexible tube 271 is formed to extend in the first direction so that an inside thereof covers a lower portion of the case 161 connected with the cable 169 and the terminals 166 and 167 protruding from the case 161, and the second flexible tube 275 has an inner space, which has an opening formed on one side thereof, to accommodate an upper portion of the case 161 on which the pressing member 165 is mounted, overlaps an upper end of the first flexible tube 271, which covers the lower portion of the case 161, and surrounds the upper portion of the case 161 with the pressing member 165.

The second flexible tube 275 extends in the direction of the tongue 5 to be long in a direction from one edge of the case 161 to which the pressing member 165 is fixed toward the other edge, which is a width direction of the case 161, to correspond to the pressing member 165 and includes a wrinkled part 277 formed to be easily flexible with the pressing member 165 when the pressing member 165 is bent or rotated, wherein the pressing member 165 extends in a direction diagonal to the first direction.

Although not shown, the second flexible tube 275 further includes an auxiliary pressing protrusion (not shown) that induces the degree of bending or rotation of the pressing member 165 to increase, wherein the auxiliary pressing protrusion protrudes on a side that surrounds one end of the pressing member 165 in the direction in which the tongue 5 enters the tongue accommodation part 26.

Figure 6:
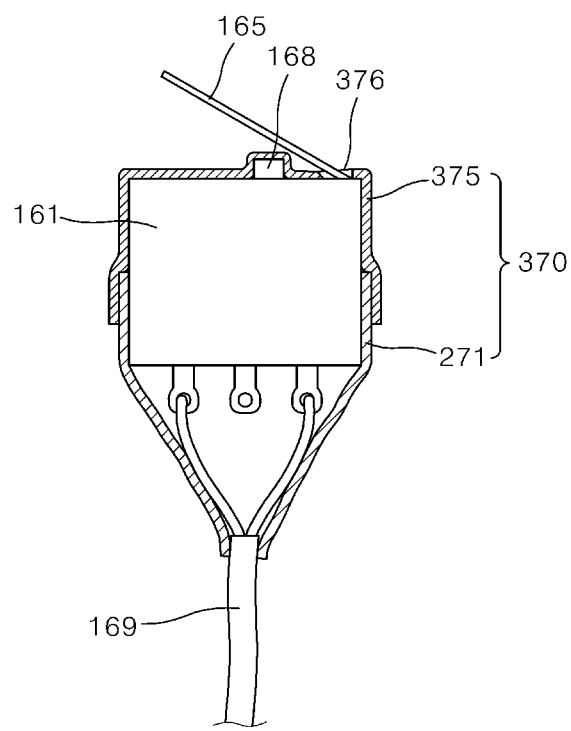
FIG. 6 is a side cross-sectional view of a part of a switch according to a third embodiment of the present invention.

A switch of a safety belt buckle according to the third embodiment of the present invention is shown in FIG. 6. Components having the same functions as those in the drawings shown above are denoted by the same reference numerals.

The safety belt buckle according to the third embodiment of the present invention has the same structure as the safety belt buckle according to the first embodiment of the present invention except for a flexible member 370.

The flexible member 370 includes a first flexible tube 271 and a second flexible tube 375.

The second flexible tube 375 has an inner space, which has an opening formed on one side thereof, to accommodate an upper portion of a case 161 on which a pressing member 165 is mounted and includes a pressing member through part 376 formed on one portion corresponding to one end of the pressing member 165 so that the pressing member 165 passes therethrough and extends. The second flexible tube 375 overlaps an upper end of the first flexible tube 271, which covers a lower portion of the case 161, and surrounds an upper portion of the case 161.

Figure 7:
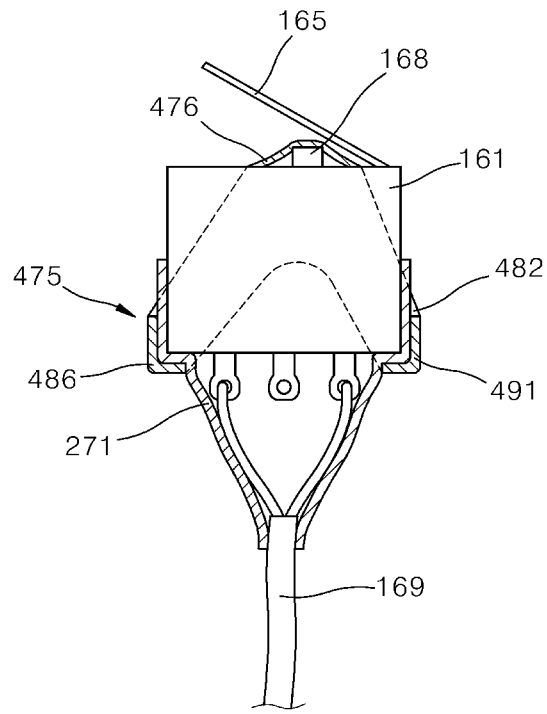
FIG. 7 is a perspective view of a part of the switch in FIG. 5.
Figure 8:
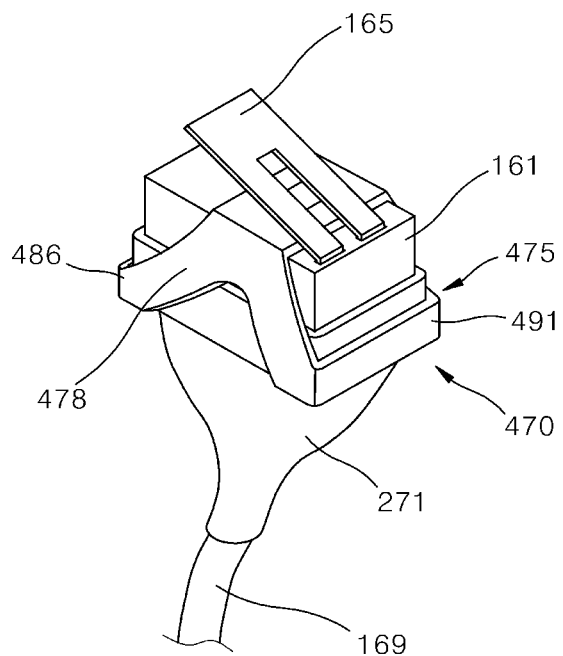
FIG. 8 is a side perspective view of a part of a switch according to a fourth embodiment of the present invention.

A waterproof switch of a safety belt buckle according to the fourth embodiment of the present invention is shown in FIGS. 7 and 8. Components having the same functions as those in the drawings shown above are denoted by the same reference numerals.

The safety belt buckle according to the fourth embodiment of the present invention has the same structure as the safety belt buckle according to the first embodiment of the present invention except for a flexible member 470.

The flexible member 470 includes a first flexible tube 271 and a flexible cover 475.

When the flexible cover 475 is mounted in the case 161, both upper corners of the case 161 are open, both lower corners of the case 161 overlap the first flexible tube 271 to fix the first flexible tube 271, and a lower center of the flexible cover 475 is open. The flexible cover 475 includes an upper cover part 476, first and second side cover parts 478 and 482, a first restraining part 486, and a second restraining part 491.

The upper cover part 476 is formed to have a length smaller than a width of the case 161 in a longitudinal direction of the pressing member 165 and is positioned on an inner side of an upper surface of the case to cover a button member 168 protruding from the case 161.

The first and second side cover parts 478 and 482 extend from both sides of the upper cover part 476 in a direction of a cable 169 to cover both sides of the case and extend to be branched in directions of lower corners of the case 161, wherein the upper cover part 476 intersects a longitudinal direction of the pressing member 165. The first restraining part 486 connects one sides of the first and second side cover parts 478 and 482 that correspond to each other, covers one lower corner of the case 161, and restrains one side of the first flexible tube 271.

The second restraining part 491 connects the other sides of the first and second side cover parts 478 and 482 that correspond to each other, covers the other lower corner of the case 161, and restrains the other side of the first flexible tube 271.

In the safety belt buckle according to the fourth embodiment of the present invention, the flexible cover 475 has open upper sides and branched lower portions so as to be easily mounted in the case 161, and the first flexible tube 271 is restrained in the first and second restraining parts 486 and 491 of the flexible cover 475 and fixed to improve water-tightness.

Figure 9:
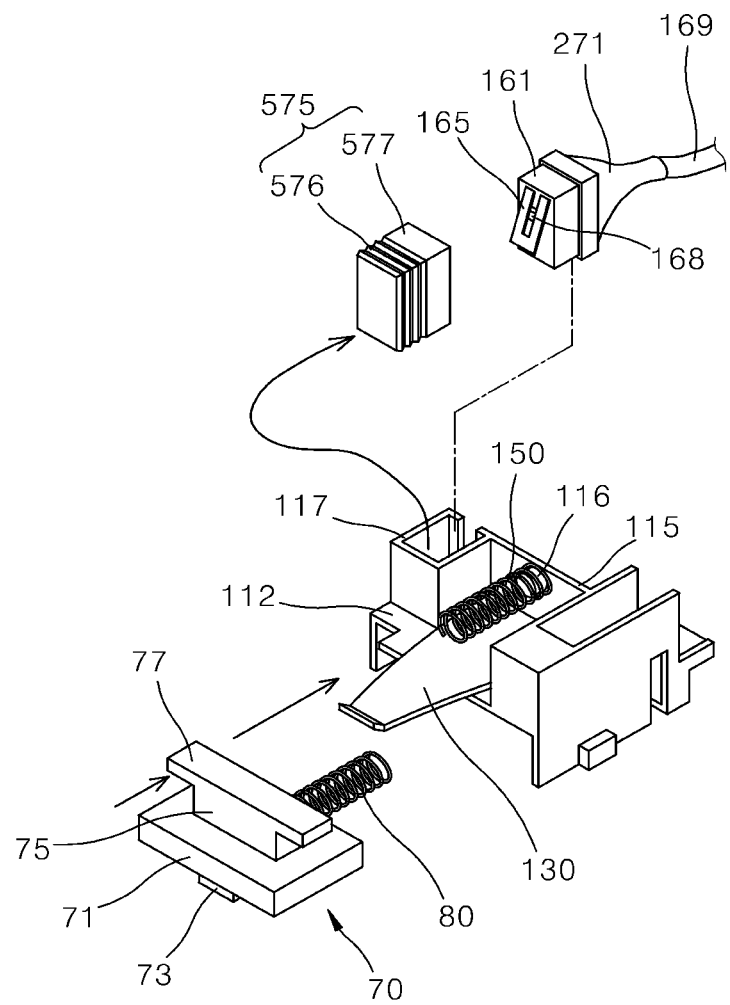
FIG. 9 is a partial exploded perspective view of a safety belt buckle according to a fifth embodiment of the present invention.

Meanwhile, a safety belt buckle according to the fifth embodiment of the present invention is shown in FIG. 9. Components having the same functions as those in the drawings shown above are denoted by the same reference numerals.

The safety belt buckle according to the fifth embodiment of the present invention in FIG. 9 has the same structure as the safety belt buckle according to the first embodiment of the present invention except for a flexible member 570.

The flexible member 570 includes a first flexible tube 271 and a flexible cover 575.

The flexible cover 575 is formed in a rectangular shape to correspond to a case 161, has an inner space having one open side to accommodate the case 161, and includes a wrinkle part 576 and a band part 577, wherein the wrinkle part 576 is formed on one side of the flexible cover 575, which corresponds to a front side, and has a length that is shortened when the one side is pressed by an ejector, and the band part 577 is formed on the other side thereof and covers a side portion of the case or the first flexible tube to be in close contact therewith.

In the safety belt buckle according to the present invention, the switch that detects whether the tongue of the safety belt is fastened is blocked from coming into direct contact with water or foreign materials, which are introduced from the outside, so as to stably detect fastening or unfastening of the tongue of the safety belt, and thus the safety belt buckle has an advantage of being stably operated even when mounted in a seat exposed to the outside such as a seat of a forklift or a tractor.

The safety belt buckle has been described with reference to the embodiments shown in the drawings but is only exemplary. It will be understood by those skilled in the art that various modifications and other equivalent embodiments are possible from the embodiments. Therefore, the technical scope of the present invention should be defined by the technical spirit of the appended claims.

What is claimed is:

1. A safety belt buckle comprising:
a lower frame and an upper frame which are coupled to form a tongue accommodation part, which has one open side, to accommodate a tongue of a safety belt;
an ejector which is pressed by the tongue entering the tongue accommodation part to be moved from a first position to a second position in the tongue accommodation part in a first direction, which is a direction in which the tongue enters, and is supported on a first flexible member in the tongue accommodation part to return to the first position when the tongue is detached from the ejector;
a latch member which, when the ejector is positioned at a first position, passes through the upper frame from an upper side of the upper frame and comes into contact with the ejector to be blocked from entering the tongue accommodation part and, when the ejector is moved to a second position, enters the tongue accommodation part to pass through an inside of the tongue so as to restrain the tongue;
a switch housing which is mounted on an upper surface of the upper frame to be spaced apart from the latch member in the first direction and has one side on which a leaf spring is mounted, wherein the leaf spring extends in a direction of the latch member to press the latch member in a direction of the tongue accommodation part;
an unfastening button which has both sides mounted in the lower frame or the upper frame to be slidable in the first direction, separates the latch member, which passes through the tongue, in a direction away from the upper frame so that the ejector returns to the first position when the unfastening button is moved in the first direction, and is supported on a second flexible member, which is fixed to the switch housing, to return to an original position; and
a switch which is inserted into the switch housing and pressed or released by the ejector, which moves in the tongue accommodation part, to generate an electric signal so as to detect whether the tongue is restrained in the tongue accommodation part or released therefrom, and blocks water or foreign materials, which are to be introduced into the tongue accommodation part, from coming into contact therewith using a waterproof unit,
wherein the switch includes a case fixed to the switch housing, a pressing member, and a button member, wherein the pressing member has one end fixed to one side of the case that faces the tongue, which is inserted into the tongue accommodation part, protrudes in a direction of the tongue, extends in a direction diagonal to the first direction, and is rotated or bent by being pressed by the ejector moved to the second position, and the button member which is moved to an inside of the case to come into electric contact with terminals in the case when the pressing member is pressed by the ejector and protrudes from the case to be released from being in electric contact with the terminals when pressing of the pressing member is released, and
the waterproof unit includes a flexible member which is formed to cover the case and the pressing member and is made of a flexible material to prevent the pressing member, which is rotated or bent by being pressed by the ejector, from interfering therewith.

2. The safety belt buckle of claim 1, wherein the flexible member includes:
a first flexible tube formed extend in the first direction so that an inside thereof covers a lower portion of the case with which a cable is connected and the terminals which protrude from the case; and
a second flexible tube which has an inner space, which has an opening formed on one side thereof, to accommodate an upper portion of the case on which the pressing member is mounted, and surrounds the upper portion of the case with the pressing member to overlap or be in contact with the first flexible tube which covers the lower portion of the case,
wherein the second flexible tube extends in the direction of the tongue to be long in a direction from one edge of the case, to which the pressing member is fixed, toward the other edge, which is a width direction of the case, to correspond to the pressing member, which extends in a direction diagonal to the first direction, and includes a wrinkled part formed to be easily flexible with the pressing member when the pressing member is bent or rotated.

3. The safety belt buckle of claim 2, wherein the second flexible tube further includes an auxiliary pressing protrusion that induces a degree of bending or rotation of the pressing member to increase, wherein the auxiliary pressing protrusion protrudes from a side that surrounds one end of the pressing member in a direction in which the tongue enters the tongue accommodation part.

4. The safety belt buckle of claim 1, wherein the flexible member includes:

a first flexible tube which is formed to extend in the first direction so that an inside thereof covers a lower portion of the case with which a cable is connected and the terminals which protrude from the case; and a second flexible tube which has an inner space, which has an opening formed on one side thereof, to accommodate an upper portion of the case on which the pressing member is mounted, includes a pressing member through part which is formed on a side corresponding to one end of the pressing member so that the pressing member passes therethrough and extends, surrounds an upper portion of the case, and overlaps or is in contact with the first flexible tube that covers a lower portion of the case.

5. The safety belt buckle of claim 1, wherein the case is formed in a rectangular shape, and the flexible member includes a first flexible tube and a flexible cover, wherein the first flexible tube is formed to extend in the first direction so that an inside thereof covers a lower portion of the case with which a cable is connected and the terminals which protrude from the case, and the flexible cover includes an upper cover part, a first side cover part, a second side cover part, a first restraining part, and a second restraining part, wherein the upper cover part is formed to have a length smaller than a width of the case in a longitudinal direction of the pressing member and is positioned on an inner side of an upper surface of the case to cover a button member that protrudes from the case, the first and second side cover parts extend from both sides of the upper cover part in a direction of the cable to cover both sides of the case and extend to be branched in directions of lower corners of the case, wherein the upper cover part intersects a longitudinal direction of the pressing member, a first restraining part connects one sides of the first and second side cover parts that correspond to each other, covers a lower corner of one side of the case, and restrains one side of the first flexible tube, and a second restraining part connects the other sides of the first and second side cover parts that correspond to each other, covers a lower corner of the other side of the case, and restrains the other side of the first flexible tube.

* * * * *